(12) United States Patent
Brand

(10) Patent No.: US 9,182,242 B2
(45) Date of Patent: Nov. 10, 2015

(54) SYSTEMS AND METHODS FOR TIME MANAGEMENT AND MULTIPOINT NAVIGATION

(71) Applicant: Noam Brand, Tel Aviv (IL)

(72) Inventor: Noam Brand, Tel Aviv (IL)

( * ) Notice: Subject to any disclaimer, the term of this patent is extended or adjusted under 35 U.S.C. 154(b) by 0 days.

(21) Appl. No.: 14/454,117

(22) Filed: Aug. 7, 2014

(65) Prior Publication Data

US 2015/0046081 A1 Feb. 12, 2015

Related U.S. Application Data

(60) Provisional application No. 61/864,575, filed on Aug. 11, 2013.

(51) Int. Cl.
*G01C 21/00* (2006.01)
*G01C 21/36* (2006.01)
*G01C 21/34* (2006.01)

(52) U.S. Cl.
CPC ............ *G01C 21/362* (2013.01); *G01C 21/343* (2013.01); *G01C 21/3492* (2013.01)

(58) Field of Classification Search
None
See application file for complete search history.

(56) References Cited

U.S. PATENT DOCUMENTS

| 7,034,691 B1 * | 4/2006 | Rapaport et al. ............ 340/573.1 |
| 2008/0046298 A1 * | 2/2008 | Ben-Yehuda et al. ............ 705/6 |
| 2012/0323662 A1 * | 12/2012 | Otto et al. .................. 705/14.25 |
| 2013/0246133 A1 * | 9/2013 | Dembo et al. ............... 705/14.1 |

* cited by examiner

*Primary Examiner* — Adam Alharbi
(74) *Attorney, Agent, or Firm* — Mark M. Friedman

(57) ABSTRACT

Systems and methods for time management and multipoint navigation adapted to receive at least one task to be performed by the user; calculate a time schedule; allow the user to view said time schedule and target information via a graphical user interface; allow for an automatic or semi-automatic periodic re-calculation of said time schedule according to information retrieved from a remote computing device; and allow the user to export said calculated orders and target information to a navigation aid.

16 Claims, 3 Drawing Sheets

| |
|---|
| 301 maintaining a categorized targets database |
| 302 receiving at least one task to be performed by the user |
| 308 receive real-time information |
| 309 provide an incentive to the user |
| 303 calculating a time schedule |
| 304 allowing the user to view said time schedule and target information |
| 305 notifying user regarding upcoming time schedule item |
| 306 allowing for an automatic or semi-automatic periodic re-calculation |
| 307 allowing the user to export said calculated orders and target information to a navigation aid |

Fig 3

SYSTEMS AND METHODS FOR TIME MANAGEMENT AND MULTIPOINT NAVIGATION

CROSS-REFERENCE TO RELATED PATENT APPLICATIONS

This application claims the benefit of priority under 35 U.S.C. Section 119(e) of U.S. application Ser. No. 61/864,575, filed Aug. 11, 2013 which is incorporated by reference in its entirety.

BACKGROUND

1. Technical Field

Embodiments of the present invention relate generally to systems and methods for time management and multipoint navigation.

2. Description of Related Art

Navigation applications and software usually allow the user to choose between route and in essence determines the shortest distance or fastest route when user specify specific targets and arrival order. The shortest distance and the fastest route does not guarantee efficiency and matching schedule constraints and it is up to the user to input the order of destinations and their exact location. Checking different target alternatives and different orders of arrival is a tedious process that requires data search and numerous route comparisons. Most users will settle on a "good enough" solution as was mentally planned by them without the assistance of the navigation software. As most users are not capable of mentally analyzing and comparing routes that usually result in the missing of the most efficient route.

Hence, an improved systems and methods as described in this application are still a long felt need.

BRIEF SUMMARY

According to an aspect of the present invention a non-transitory computer-readable medium storing processor executable instructions on a computing device for time management and multipoint navigation, adapted to: maintain a categorized targets database comprising name of the target, location information and at least one limitation selected from the group of: opening hours; user preferences; target preferences; and transportation limitations; receive at least one task to be performed by the user comprising: at least one target; at least one action to perform in said at least one target; deadline or time limitation for performing said at least one action; and priority indicator for said at least on action and at least one task, calculate a time schedule comprising: ordering said at least one task, target and action; assigning recommended departure time for said at least one task, target and action; allow the user to view said time schedule and target information via a graphical user interface; notify user regarding upcoming time schedule item; allow for an automatic or semi-automatic periodic re-calculation of said time schedule according to information retrieved from a remote computing device; allow the user to export said calculated orders and target information to a navigation aid; wherein said navigation aid will present via a user interface the route to the user.

It is further within provision of the invention to allow the system to maintain a categorized targets database is achieved by retrieving information from at least one remote database.

It is further within provision of the invention to allow the system to be in data communication with at least one remote computing device and to receive real-time information selected from the group of: traffic information, public transport information.

It is further within provision of the invention to allow the system to allow at least one third party to provide an incentive to the user.

It is further within provision of the invention to allow the automatically manipulation of said calculated orders and target information in order to redeem said incentive.

It is further within provision of the invention to allow for an automatic or semi-automatic periodic re-calculation of said time schedule according to user's notification.

It is further within provision of the invention to further calculate using at least one limitation selected from the group of: consistency of the tasks and actions; conditions required for moving to the next task and action; non-parallel tasks and actions; unique task and action; lack of target replacements; prioritization of tasks and actions.

Another aspect of the present invention provides a method for time management and multipoint navigation comprising a computing device containing a non-transitory computer-readable medium storing processor executable instructions, and comprising steps of: maintaining a categorized targets database comprising name of the target, location information and at least one limitation selected from the group of: opening hours; user preferences; target preferences; and transportation limitations; receiving at least one task to be performed by the user comprising: at least one target; at least one action to perform in said at least one target; deadline or time limitation for performing said at least one action; and priority indicator for said at least on action and at least one task, calculating a time schedule comprising: ordering said at least one task, target and action; assigning recommended departure time for said at least one task, target and action; allowing the user to view said time schedule and target information via a graphical user interface; notifying user regarding upcoming time schedule item; allowing for an automatic or semi-automatic periodic re-calculation of said time schedule according to information retrieved from a remote computing device; allowing the user to export said calculated orders and target information to a navigation aid.

It is further within provision of the invention to further comprise a step communicating via data communication with at least one remote computing device and to receive real-time information selected from the group of: traffic information, public transport information.

It is further within provision of the invention to further comprise step of allowing at least one third party to provide an incentive to the user.

It is further within provision of the invention to further comprise step of automatically manipulate said calculated orders and target information in order to redeem said incentive.

It is further within provision of the invention to further comprise step of allowing for an automatic or semi-automatic periodic re-calculation of said time schedule according to user's notification.

It is further within provision of the invention to further comprise step of allowing for calculating using at least one limitation selected from the group of: consistency of the tasks and actions; conditions required for moving to the next task and action; non-parallel tasks and actions; unique task and action; lack of target replacements; prioritization of tasks and actions.

These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

In order to understand the invention and to see how it may be implemented in practice, a plurality of embodiments will now be described, by way of non-limiting example only, with reference to the accompanying drawings, in which:

FIG. 3 illustrates a flow chart of a method of an embodiment of the present invention.

DETAILED DESCRIPTION

Figure 1:
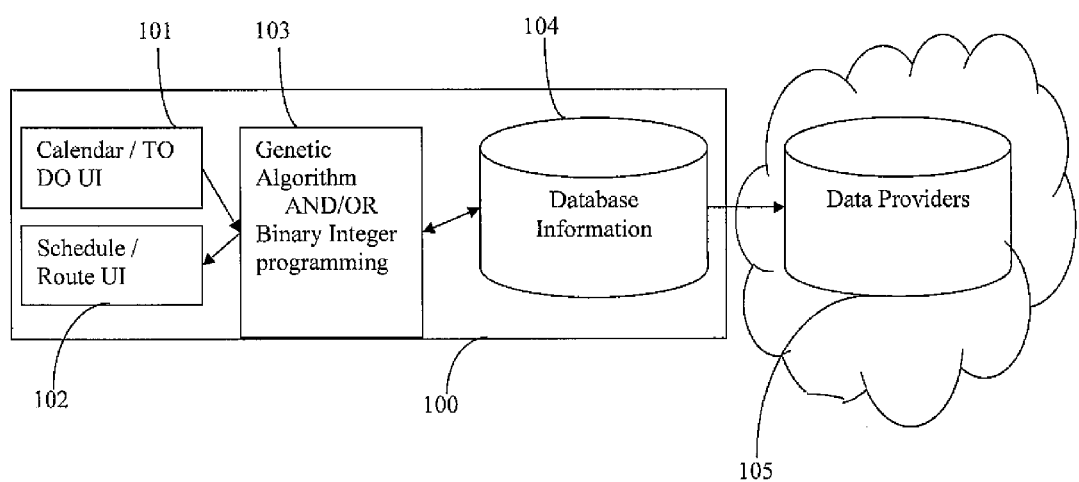
FIG. 1 illustrates the components of an embodiment of the present invention.

The following description is provided, alongside all chapters of the present invention, so as to enable any person skilled in the art to make use of said invention and sets forth the best modes contemplated by the inventor of carrying out this invention. Various modifications, however, will remain apparent to those skilled in the art, since the generic principles of the present invention have been defined specifically to provide a means and method for providing systems and methods for to time management and multipoint navigation.

In the following detailed description, numerous specific details are set forth in order to provide a thorough understanding of embodiments of the present invention. However, those skilled in the art will understand that such embodiments may be practiced without these specific details. Just as each feature recalls the entirety, so may it yield the remainder. And ultimately when the features manifest, so an entirely new feature be recalled. Reference throughout this specification to "one embodiment" or "an embodiment" means that a particular feature, structure, or characteristic described in connection with the embodiment is included in at least one embodiment of the invention.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term 'plurality' refers hereinafter to any positive integer (e.g, 1, 5, or 10).

The invention relates to systems and methods for allowing an efficient planning of multipoint route that has schedule and forms of restraint.

Generally speaking, the system and method may allow the creation of a "to do list" while maintaining a database of plurality of targets and replacements for those targets, wherein each "to do" item will have its own constraints and options. The user will hence be freed from the need to plan the integration of all of the "to do" items into an operative route. The system and method will allow the automatic creation of a specific custom made route taking into consideration the restraint entered by the user, the restraint of the targets as maintained in the database, the traffic etc. Hence provide for a smart navigation choices.

To further explain benefits of the present invention, one can take for example a situation in which the user have 4 tasks or actions in specific locations when the only limitation is that the third one should be before the second one. The system will compare 3 different combinations: 3-2-1-4; 1-3-2-4; 1-4-3-2. A mental action by human of the same will result in wasting time examining alternatives or inefficiency (if the targets are not in specific locations we will have much more alternatives making it practically impossible to manually compare them all).

The system comprise two main components: the first is a local application designed to be executed on a computing device, for example a smartphone, navigation device, personal computer or as a web based application and the second is a database of plurality of targets designated to be kept and accessible via data communication by the application, said database may be located on a server accessible via the internet or located locally on the computing device running the application. The database may also be located both on an internet server and on the local computing device and allow for updates whenever data communication is available between the two.

In an embodiment of the invention, a non-transitory computer-readable medium storing processor executable instructions on a computing device for time management and multipoint navigation, may be adapted to:

Maintain a categorized targets database, wherein said database comprise information regarding targets that a user may be required to, especially regarding targets that has plurality of replacements such as bank branches, ATMs, pharmacies, shops of sorts, governmental institutes etc. For example, the database may contain all the branches of a specific bank in which the user has an account. When the user wishes to make an action that requires his physical presence in the bank, it does not matter to which branch he'll go, hence knowing of all or at least several branches will allow the system to make an analytical choice regarding which branch to go to taking into consideration the user's, bank's and transportation limitations and constraints.

The database may hold any information regarding the target, for example—the name of the target, the exact location of the target, the opening hours of the target, user preferences regarding the target (for example, the user may dislike a specific branch or prefer a specific branch of an establishment), target preferences and transportation limitations (for example, the lack of public transportation to an area, the location of a parking lot, the location of a public transport station, hours of public transport operations, etc.).

The system will allow the management of a "to do list" that may be comprised of tasks and actions. A task may comprise at least one specific action, for example, one might have a "buy a car" task that may comprise the following actions: "go to used car lot to choose a car", "make phone calls to other lots to compare", "go to bank to get a loan", "go to the relevant car lot and buy the car".

As can be appreciated, each action comprises a target and an action to perform in said target. In some embodiments of the invention a plurality of actions may be performed in a target, for example, "make phone calls to other lots to compare" can be performed from the used car lot and does not require a particular location.

The user may also input the restraints for each action, for example, define one hour to spend in the car lot and departing the car lot on 09:00.

A priority indicator for said at least on action and at least one task may be also inputted into the system. In the example above, the actions and target have a specific logical order, however in a case that a user plan a route that consists of "go to pharmacy" and "take the car to the mechanic", there would be a benefit to the user to indicate to the system which is more important hence allow for a better planning of the route.

Once the user entered the task, its actions and restraints into the system, the system will allow the automatic or semi-automatic calculation and creation of a route.

The system will then calculate a time schedule comprising ordering said at least one task, target and action and assigning the recommended departure time for each. All with the constraints as mentioned above. The calculation will allow the system to choose the most time efficient route for a "used car lot" and bank branch from the database.

The system will then present via a graphical user interface the planned time schedule and target information.

In some embodiments of the invention, the system will alert and notify the user regarding upcoming time schedule item. For example, the system may be predefined to alert the user on 08:30 that his planned route was planned to start on 09:00 and any change in the departure time will affect the current plan.

In order to allow the plan to be realistic, the system will allow for an automatic or semi-automatic periodic re-calculation the time schedule according to information retrieved from a remote computing device, for example, a traffic information server that may be maintained by a third party or by the user, a police information system etc. In another example, the remote computing device may be the navigation aid, providing information that system interoperates as a change of plans, for example in case the user should be in location A at the specific time, but the navigation aid provides information that the user in is location B.

In some embodiments of the invention, the user may also notify the system manually regarding any change of plans that require re-calculation.

In some embodiments of the invention the system may allow the user to export the calculated orders and target information to a navigation aid, for example to free navigation application as "Waze"™ or "Google maps"™. In other embodiments of the invention, the system may allow the user to export the calculated orders and target information to a navigation aid running on the same computing device as the application.

The interface with navigation system such as mentioned above that determines the shortest distance route or fastest with the system will provide the user with a tailor made and realistic schedule.

The navigation aid will present via a user interface the route to the user and as known in the art may allow for any navigation aid features based on said calculated orders and target information.

In some embodiments of the invention the system will receive a generally constant and updated information in real-time from a remote computing device regarding the current traffic and public transportation situation and re-calculate the planned route according to said information.

In some embodiments of the invention, the system may maintain said database by retrieving information from at least one remote database. For example, the system may employ web crawlers and web spiders to build and maintain the database.

In some embodiments of the invention, the system will allow a sub-system of advertisement and coupons by third parties. Hence, allowing a business entity, for example, to provide the user with incentives to choose manipulate the route even if it is not the most efficient route. In some embodiments of the invention, the system will automatically manipulate the route to allow the user to redeem coupons or other incentives.

FIG. 1. present a simplified flow chart of an embodiment of the invention, the system 100 comprises two user interfaces: To do interface 101 and a schedule/route interface 102, an optimization processes 103 that may be utilizing, for example, a Heuristic optimization (e.g genetic algorithm, Ant colony etc) or an exact optimization method e.g relaxation of Linear programming(LP) solving algorithm, a database 104 containing information regarding the targets and external data providers 105 that may be of any sort, such as Yellow Pages™, API of third parties of sorts, etc.

In some embodiments of the invention, the optimization, calculation and preparation of the route may be done using various known mathematical problem solving algorithms and heuristics as well as using novel combination of those.

For example, algorithms pertain to the Euclidean Generalized Traveling Salesman Problem may be employed (EGTSP). However, an embodiment of the present invention may allow the consideration and calculation of time and time windows constraints as well as prioritization. In addition, in each category the system will choose a specific target in each category as explained in details. Hence, allowing the system to be practical and take into consideration only solutions that will allow the user to achieve its goals.

In some embodiments of the invention, the constraints that the system take into account and calculate may include at least one of the following limitations: consistency of the tasks/actions; conditions required for moving to the next task/action; non-parallel tasks/actions; unique task/action; lack of target replacements; prioritization of tasks/actions.

In some embodiment of the invention, the system will be adapted to propose the user, via a user interface, with changes in said at least one task (for example, to change time of arrival to target, the order of targets, etc) wherein said changes will improve said calculated orders.

In some embodiments of the invention the system may utilize Linear programming(LP) and/or Linear programming relaxation (e.g Branch and bound, Cutting plane etc) in order to reduce computing time instead of Binary integer programming(BIP) in order to reduce computing time.

Figure 2:
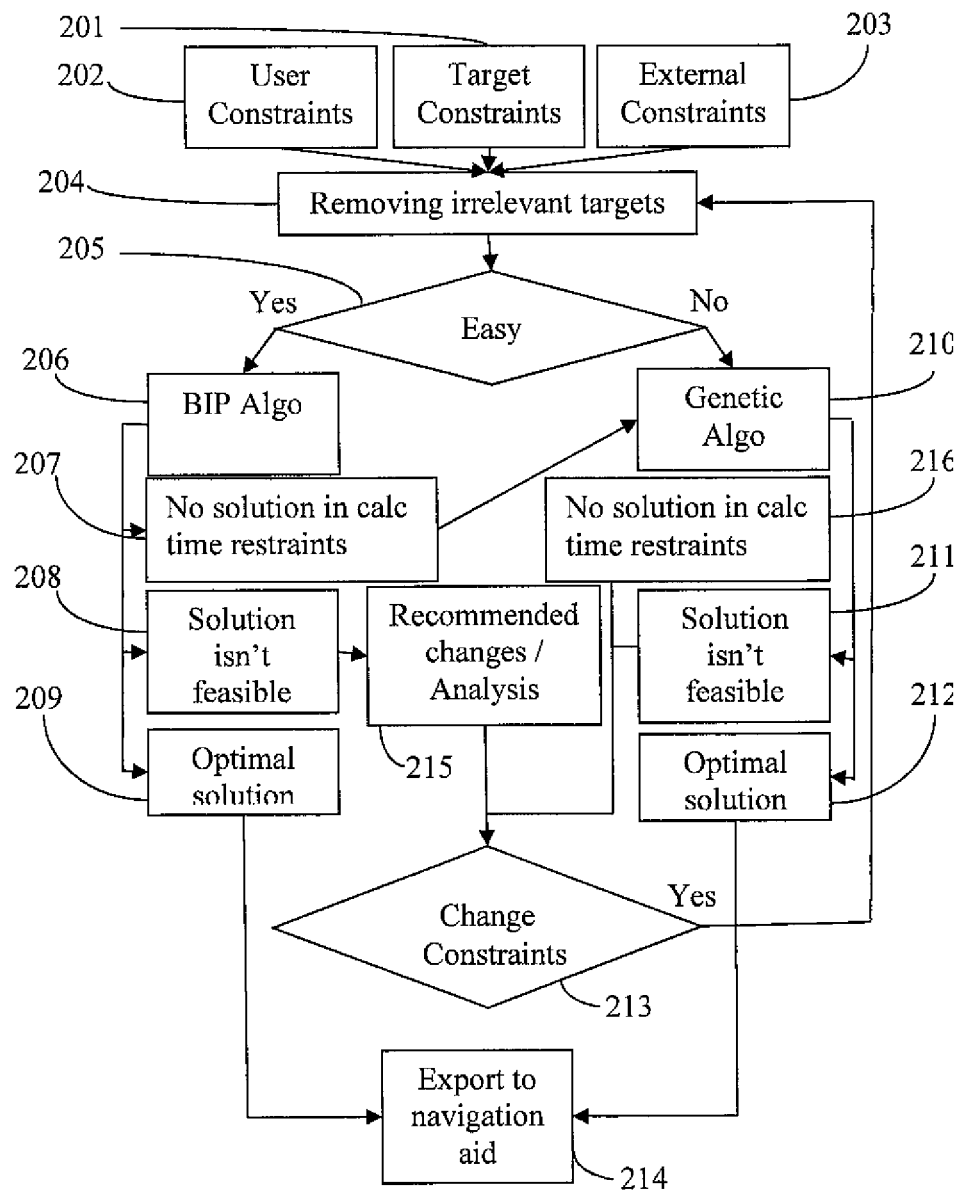
FIG. 2 illustrates a flow chart of a process of an embodiment of the present invention.

In some embodiments of the invention, as presented in FIG. 2, the process may start with the existing of a user constraints 201 as inputted by the user, target constraints 202 as appear in the database and external constraints 203 may be retrieved from remote computing device and/or by user manual input. The system will initially remove any irrelevant target 204, for example by means of calculating the distance of bank branches from the current location of the user and removing any branch which is located more than 2 Km from the user (or more than 2 Km relative to the users pre-determined obligatory daily route). The system may then consider if there is an easy solution using predefined parameters (for example, the complexity due to number of possible options) 205. In case of a relative easy solution a BIP algorithm may be employed 206. According to some embodiments of the invention, there are three general results: no solution in current computing or calculation time restraints 207 that will result in the employment of a genetic algorithm 210 or non-feasible solution 208 that will cause the system to perform a sensitivity analysis and/or any other analysis in order to suggest the user regarding possible or recommended changes in the constraints inputted 215, and an optimal (according to predefined parameters) solution 209 that will result in exporting the information to a navigation aid. In case of a non-easy solution a genetic algorithm 210 will be employed, which in some embodiments of the invention may have two results: a non-feasible solution 213, no solution in current computing or calculation time restraints 216 or an optimal solution (according to predefined parameters) 212. In case of a non-feasible solution the user will be prompt that a change of constraints is required. In case of no solution in current computing or calculation time restraints 216 the user may be required or prompted to change any of the limitations or constraints in order to allow the calculation. In some embodiments of the invention, the user may be presented with recommendations regarding to which constraints to change. In case of optimal solution, the information will be exported to the navigation aid 214.

FIG. 3 represent an embodiment of a method of the invention, showing steps of:

301 maintaining a categorized targets database comprising name of the target, location information and at least one limitation selected from the group of: opening hours; user preferences; target preferences; and transportation limitations.

302 receiving at least one task to be performed by the user comprising: at least one target; at least one action to perform in said at least one target; deadline or time limitation for performing said at least one action; and priority indicator for said at least on action and at least one task.

303 calculating a time schedule comprising: ordering said at least one task, target and action; assigning recommended departure time for said at least one task, target and action.

304 allowing the user to view said time schedule and target information via a graphical user interface.

305 notifying user regarding upcoming time schedule item.

306 allowing for an automatic or semi-automatic periodic re-calculation of said time schedule according to information retrieved from a remote computing device.

307 allowing the user to export said calculated orders and target information to a navigation aid.

308 communicating via data communication with at least one remote computing device and to receive real-time information selected from the group of: traffic information, public transport information.

309 allowing at least one third party to provide an incentive to the user and manually or automatically manipulate said calculated orders and target information in order to redeem said incentive.

Although selected embodiments of the present invention have been shown and described, it is to be understood the present invention is not limited to the described embodiments. Instead, it is to be appreciated that changes may be made to these embodiments without departing from the principles and spirit of the invention, the scope of which is defined by the claims and the equivalents thereof.

The invention claimed is:

1. A non-transitory computer-readable medium storing processor executable instructions on a computing device for time management and multipoint navigation, when executed by a processor, the processor executable instructions causing the processor to perform:

maintaining a categorized targets database comprising name of the target, location information and at least one limitation selected from the group of: opening hours; user preferences; target preferences; and transportation limitations;

receiving tasks to be performed by the user comprising:
  a plurality of targets;
  at least one action to perform in each target;
  deadline or time limitation for performing said at least one action;
  priority indicator for said at least on action and at least one task; and
  a condition for ordering said tasks, targets and actions;

determining whether the condition includes a specific order of at least one of (1) at as two targets, (2) at least two tasks or (3) at least two actions;

calculating a time schedule comprising: ordering said tasks, targets and actions, wherein if the condition includes the specific order, the ordered tasks, targets and actions including the at least one of (1) at least two targets, (2) at least two tasks or (3) at least two action in the specific order;

assigning recommended departure time for each of said tasks, targets and actions;

displaying said time schedule and target information via a graphical user interface;

notifying user regarding upcoming time schedule item;

automatically or semi-automatically performing periodic re-calculation of said time schedule according to information retrieved from a remote computing device; and allowing the user to export said calculated orders and target information to a navigation aid, wherein said navigation aid will present via a user interface the route to the user, and wherein the specific order of the at least one of (1) at least two targets, (2) at least two tasks or (3) at least two action is maintained after the periodic re-calculation.

2. The processor executable instructions of claim 1 wherein maintaining a categorized targets database is achieved by retrieving information from at least one remote database.

3. The processor executable instructions of claim 1 further adapted to be in data communication with at least one remote computing device and to receive real-time information selected from the group of: traffic information, public transport information.

4. The processor executable instructions of claim 1 further adapted to allow at least one third party to provide an incentive to the user.

5. The processor executable instructions of claim 3 further adapted to automatically manipulate said calculated orders and target information in order to redeem said incentive.

6. The processor executable instructions of claim 1 further adapted to allow for an automatic or semi-automatic periodic re-calculation of said time schedule according to user's notification.

7. The processor executable instructions of claim 1 further adapted to calculate using at least one limitation selected from the group of: consistency of the tasks and actions; conditions required for moving to the next task and action; non-parallel tasks and actions; unique task and action; lack of target replacements; prioritization of tasks and actions.

8. The processor executable instructions of claim 1 further adapted to propose the user with changes in said at least one task wherein said changes will improve said calculated orders.

9. A method for time management and multipoint navigation comprising a computing device containing a non-transitory computer-readable medium storing processor executable instructions, and comprising steps of:

maintaining a categorized targets database comprising name of the target, location information and at least one limitation selected from the group of: opening hours; user preferences; target preferences; and transportation limitations;

receiving tasks to be performed by the user comprising:
  a plurality of targets;
  at least one action to perform in each target;
  deadline or time limitation for performing said at least one action; and priority indicator for said at least on action and at least one task; and a condition for ordering said tasks, targets and actions;

determining whether the condition includes a specific order of at least one of (1) at least two targets, (2) at least two tasks or (3) at least two actions;

calculating a time schedule comprising: ordering said tasks, targets and actions, wherein if the condition includes the specific order, the ordered tasks, targets and actions including the at least one of (1) at least two targets, (2) at least two tasks or (3) at least two action in the specific order;

assigning recommended departure time for each of said tasks, targets and actions;

displaying said time schedule and target information via a graphical user interface;

notifying user regarding upcoming time schedule item;

automatically or semi-automatically performing periodic re-calculation of said time schedule according to information retrieved from a remote computing device; and allowing the user to export said calculated orders and target information to a navigation aid, wherein the specific order of the at least one of (1) at least two targets, (2) at least two tasks or (3) at least two action is maintained after the periodic re-calculation.

10. The method of claim 9 wherein maintaining a categorized targets database is achieved by retrieving information from at least one remote database.

11. The method of claim 9 further comprise a step communicating via data communication with at least one remote computing device and to receive real-time information selected from the group of: traffic information, public transport information.

12. The method of claim 9 further comprising step of allowing at least one third party to provide an incentive to the user.

13. The method of claim 12 further comprising step of automatically manipulate said calculated orders and target information in order to redeem said incentive.

14. The method of claim 9 further comprising step of allowing for an automatic or semi-automatic periodic re-calculation of said time schedule according to users notification.

15. The method of claim 9 further comprising step of allowing for calculating using at least one limitation selected from the group of: consistency of the tasks and actions; conditions required for moving to the next task and action; non-parallel tasks and actions; unique task and action; lack of target replacements; prioritization of tasks and actions.

16. The method of claim 9 further comprising step of proposing to the user via a user interface changes in said at least one task wherein said changes will improve said calculated orders.

* * * * *